Figure 1:
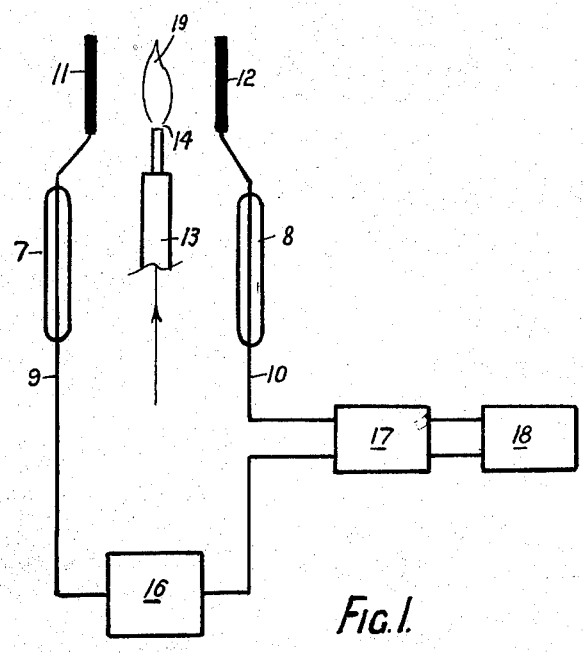

March 30, 1965 Z. S. KRZEMINSKI ETAL 3,175,886
APPARATUS FOR THE MEASUREMENT OF ELECTRICAL
CONDUCTIVITY IN COMBUSTION ZONES
Filed Aug. 13, 1962 2 Sheets-Sheet 2
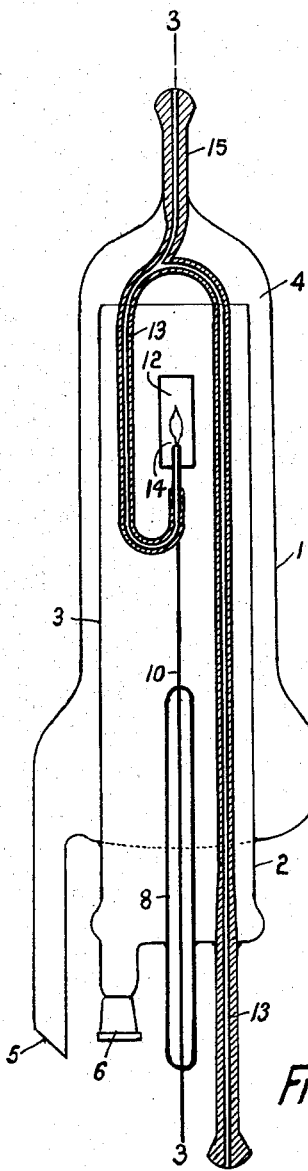
FIG. 2.
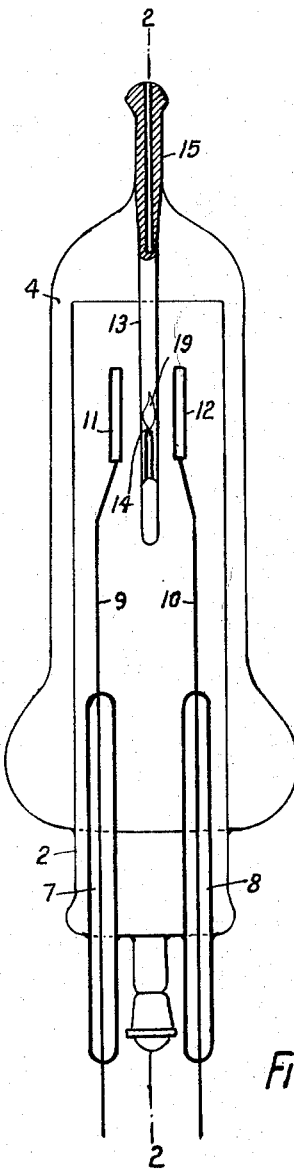
FIG. 3.
INVENTORS
Z. S. KRZEMINSKI
J. B. SCHRAMEYER
By
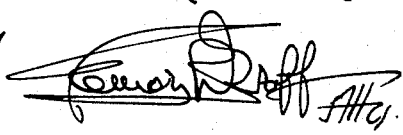
Atty.

United States Patent Office 3,175,886
Patented Mar. 30, 1965

3,175,886
APPARATUS FOR THE MEASUREMENT OF ELECTRICAL CONDUCTIVITY IN COMBUSTION ZONES
Zbigniew Stanislaw Krzeminski, Lindfield, New South Wales, and Johan Barend Schrameyer, Liverpool, New South Wales, Australia, assignors to C.S.R. Chemicals Pty. Limited, Rhodes, New South Wales, Australia, a company of Australia
Filed Aug. 13, 1962, Ser. No. 216,460
Claims priority, application Australia, Aug. 16, 1961, 8,151/61, Patent 248,713
3 Claims. (Cl. 23—254)

The invention relates to an apparatus for the measurement of electrical conductivity in combustion zones and particularly to such apparatus used for the detection of the presence of organic gases and vapours. Such an apparatus, hereinafter referred to as "detector" is particularly useful in gas chromatography.

Apparatus of this kind have been devised in which the probes used as electrodes are placed on insulating supports above a flame used for combustion.

These apparatus have, however, shown several disadvantages. The probes are easily overheated and thus give rise to electron emission producing unwanted electrical noise in the detector apparatus. The probes are also prone to contamination by solid deposits from combustion products.

As the insulators are also in the vicinity of the flame, they too can be overheated and are easily contaminated on their surface by solid or liquid substances resulting from the combustion.

The above disadvantages are overcome according to the invention by an apparatus for the measurement of electrical conductivity in combustion zones in which the probes or electrodes are placed on opposite sides of the burner and the insulators carrying said probes are placed below the combustion zone in a stream of relatively cool gas.

This new arrangement of the various components of the detector not only overcomes the above stated disadvantages but in gas chromatography permits also measurements by the use of stationary phases containing silicone oils and greases and phosphates which would quickly foul the electrodes in detectors of known design.

One embodiment of the invention in which the detector is particularly adapted for use in connection with gas chromatography is described hereinafter in connection with the drawings.

FIGURE 1 shows schematically the arrangement of the electrodes and the electrical circuit in a detector according to the invention;

FIGURES 2 and 3 are two sections of a detector according to the invention, taken along lines 2—2 of FIGURE 3 and lines 3—3 of FIGURE 2 respectively.

Referring to FIGURES 2 and 3 the detector consists mainly of a closed substantially cylindrical vessel 1 made from borosilicate glass. Through the lower end of the vessel 1 a cylinder 2 of borosilicate glass projects into the vessel 1 and is sealed therein at the lower end forming inside the vessel a second wall 3 extending substantially the full length of the vessel 1 but providing a gap 4 at the upper end thereof for communication between the inner cylinder 2 and the space between the latter and the wall of the vessel 1. A suitable exhaust opening 5 at the lower end of vessel 1 permits gases within the above space to enter the outside atmosphere.

The inner cylinder 2 is closed at its lower end except for an air inlet 6. Sealed within this lower end are two insulators 7 and 8 carrying electrical leads 9 and 10 respectively for the detector electrodes 11 and 12 arranged within the cylinder 2 as described later on. In addition, a pipeline 13 leads through the lower end of the cylinder 2 to a burner 14 arranged in the longitudinal axis of the cylinder 2 in the upper part thereof. The burner 14 formed by a simple orifice at the end of the pipeline 13 is fed by hydrogen supplied through the pipeline. A branch pipe 15 of this pipeline leads from a loop thereof out of the upper part of the vessel 1 and is connectable with the effluent gas supply which is to be tested. The hydrogen mixed with the effluent gas is burnt in the burner 14 is a stream of air supplied through the abovementioned air inlet 6 while the combustion gases can leave the vessel 1 through the exhaust opening 5 mentioned above.

The two flat electrodes 11 and 12 are arranged in planes parallel to the axis of cylinder 2 on two opposite sides of the burner orifice 14 and equidistant therefrom; and in such position so that the lower edges of the electrodes 11 and 12 are about 2 mm. below the burner orifice.

The electrodes 11 and 12 (FIGURE 1) which are preferably made from platinum are connected by platinum wires 9 and 10 leading through the abovementioned insulators 7 and 8, with an electrical circuit including a source of electrical D.C. potential 16, a D.C. impedance converter 17 and an indicating or recording meter 18 of known design. By these means the electrical conductivity of the flame 19 can be measured.

The size of the electrodes 11 and 12 is not very critical and in one example platinum strips of 15 x 3 mm. with a thickness of 0.8 mm. have been used successfully.

The distance between the electrodes can easily be adjusted in accordance with the size of the flame by means of a wire passed through the air inlet 6 (FIGURE 2) and the size of the flame 19 is in turn dependent on the flow rates of hydrogen and effluent gas. The optimum distance between the electrodes is in each case the distance which results in the best signal-to-noise ratio in the electrical circuit. In a practical example using a flow rate for hydrogen of 20 ml./min. and for nitrogen of 30 to 40 ml./min. the optimum distance between the electrodes was found to be 7 mm.

The insulators 7 and 8 are preferably made from borosilicate glass to give high resistance and to prevent any piezo-electric effects. The burner orifice 14 can be made from an inert material such as platinum, monel, stainless steel, borosilicate glass or a ceramic material.

The detector is preferably mounted at the base and with its upper part including the electrodes inside the furnace, which also serves to maintain a constant temperature of the gas chromatography column. This effectively eliminates a condensation of higher boiling point materials which might be present. As the main part of the insulators is outside the furnace the insulators are kept at a low temperature and thus cannot become over-heated even if the detector is used at temperatures up to about 500° C., i. e. temperatures limited only by the softening point of the glass used for the detector vessel.

We claim:
1. Apparatus for the measurement of electrical conductivity in combustion zones comprising a substantially cylindrical closed vessel having an exhaust outlet at its lower end, a hollow cylinder of smaller diameter than said vessel passing with its open end through the lower end of said vessel and extending close to the upper end thereof leaving a gap for communication between the space inside the cylinder and the space between the cylinder wall and the wall of said vessel, the lower end of said cylinder being substantially closed and having an air inlet leading through said closed end, a burner in the upper part of said cylinder arranged in its central axis, a feed pipe for said burner passing through the lower end of said cylinder and a branch of said feed pipe passing through the upper end of said vessel, a pair of flat electrodes arranged on opposite sides of said burner and equidistantly therefrom in parallel planes, a pair of insulators passing through the lower end of said cylinder and a pair of electrically conductive supporting wires passing through said insulators and supporting said electrodes.

2. Apparatus according to claim 1 in which the feed pipe and its branch are joined near the top of the vessel, the feed pipe forming a loop at said joint and extending downwardly below said electrodes, the end of said feed pipe being upturned, and the burner being formed by an orifice at said upturned end, said orifice being positioned above the lower edges of said electrodes.

3. Apparatus for the measurement of electrical conductivity in combustion zones comprising a substantially cylindrical closed vessel, a cylinder concentrically arranged in said vessel and spaced apart therefrom to form a double wall structure, the lower end of said cylinder passing through the lower end of said vessel and having an air inlet provided therein, the upper end of said cylinder being open and leaving a gap between said cylinder and said vessel for communication with the space therebetween, an exhaust outlet in the lower end of said vessel and communicating with said space, a burner with an orifice in the upper part of said cylinder, a pair of electrodes arranged on opposite sides of said orifice and a pair of insulators supporting said electrodes, said pair of insulators being arranged upstream of said orifice within a stream of air passing from said air inlet to said exhaust outlet, the temperature of said stream in the vicinity of said insulators being substantially below the temperature at said orifice.

References Cited by the Examiner
UNITED STATES PATENTS

| | | | |
|---|---|---|---|
| 2,991,158 | 7/61 | Harley | 23—232 |
| 3,086,848 | 4/63 | Reinecke | 23—232 |
| 3,095,278 | 6/63 | Green | 23—232 |

OTHER REFERENCES

Harley: "Nature" 181, 177, 178 (1958).

Thompson: "J. of Chromatography" 2, 148–154 (1959).

MORRIS O. WOLK, *Primary Examiner.*

DELBERT E. GANTZ, *Examiner.*